June 3, 1930.　　　　H. H. LOGAN　　　　1,761,352
HOSE COUPLING
Filed May 7, 1926
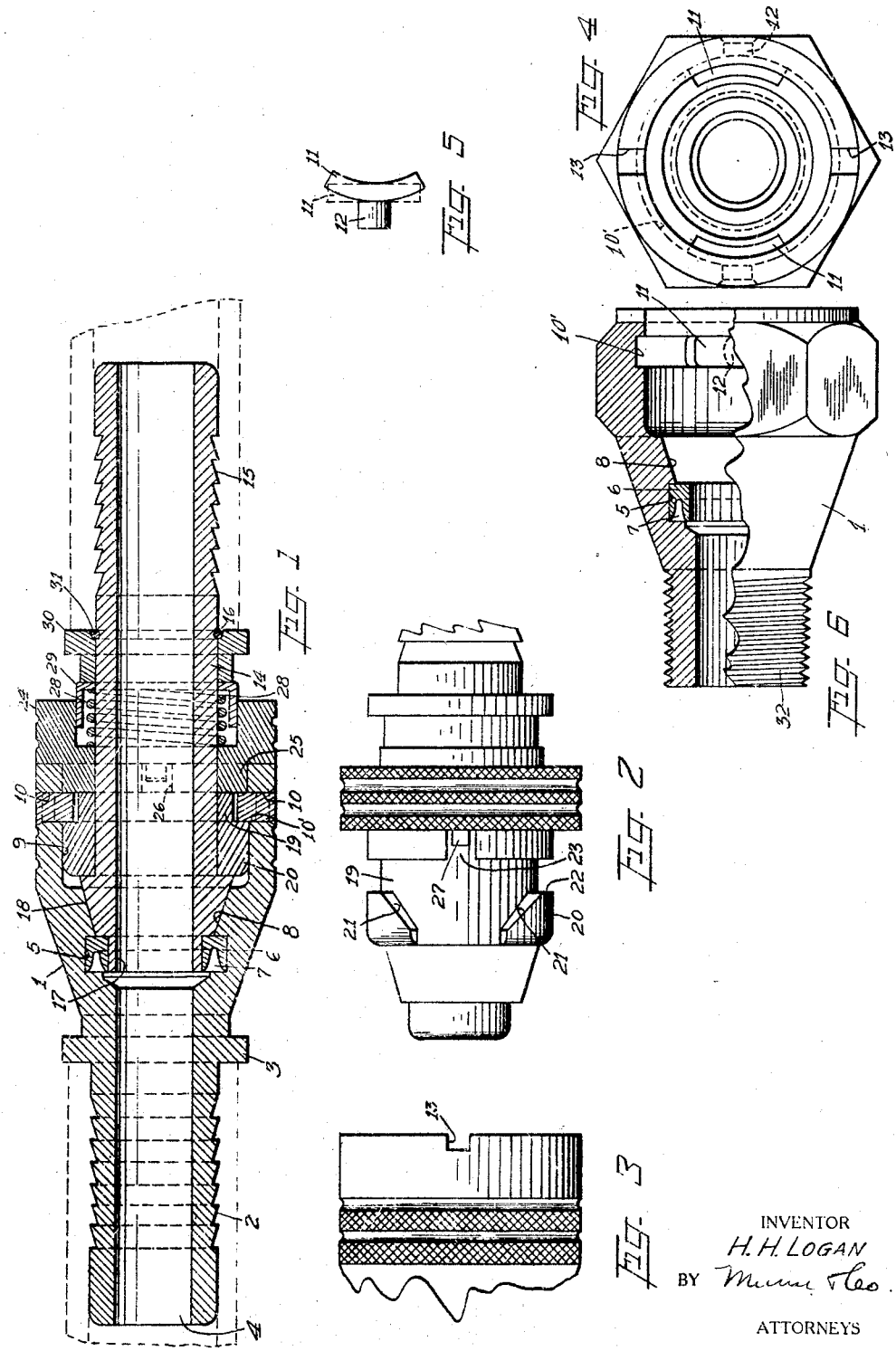
INVENTOR
H. H. LOGAN
BY
ATTORNEYS Patented June 3, 1930

1,761,352

UNITED STATES PATENT OFFICE

HENRY H. LOGAN, OF CHICAGO, ILLINOIS

HOSE COUPLING

Application filed May 7, 1926. Serial No. 107,420.

My invention relates to improvements in hose couplings, and it consists in the combinations, constructions, and arrangements herein described and claimed.

An object of my invention is to provide a hose coupling consisting of male and female members in which a simple means is employed for positively locking the members to form a fluid-tight joint.

A further object of my invention is to provide a device of the type described in which the members may be locked or unlocked by turning the male member in either direction with respect to the female member.

A further object of my invention is to provide a device of the type described in which a used male member may be replaced by a new male member and a desirable connection with the female member assured.

A further object of my invention is to provide a device of the type described which is simple in construction, and durable and efficient for the purpose intended.

Other objects and advantages will appear in the following specification, and the novel features of the invention will be particularly pointed out in the appended claims.

My invention is illustrated in the accompanying drawings, forming part of this application, in which Figure 1 is a sectional view of the male and female members attached to each other, Figure 2 is a front elevation of the male member, a portion thereof being broken away, Figure 3 is a fragmentary view of the female member, Figure 4 is a front elevation of the female member, Figure 5 is a front elevation of a portion of the female member, and Figure 6 is a sectional view of the female member provided with a metal pipe connection, parts thereof being shown in elevation.

In carrying out my invention, I provide a female member 1 having a hose connection 2 and an annular flange 3. The female member 1 is provided with an opening 4 which tapers into an annular recess 5 which is adapted to receive a gasket 6. The gasket 6 is provided with a recess 7 for a purpose hereinafter described. The female member is provided with a tapering recess 8 and a relatively large opening 9. The female member is provided with relatively small openings 10, which taper outwardly adjacent the periphery of the female member, and an annular groove 10'.

Keys 11, see Figure 5, are cut from a flat strip of material. The keys are machined so as to form integral pins 12 thereon. After this is completed, the ends of the keys 11 are bent downwardly from the position shown in dotted lines into the arcuate-shaped position shown in full lines in Figure 5. The keys are placed within the female member, the pins 12 being received within the openings 10. The ends of the pins 12 are riveted, as shown in Figure 1, thus rigidly securing the keys in place. The female member is provided with slots 13 on each side thereof, see Figures 3 and 4.

A male member has a tube 14 which is provided with a hose connection 15 and a semispherical recess 16. The tube 14 is provided with an annular flange 17 and a conical surface 18. A ring 19 having integral lugs 20 is disposed concentric with the tube 14. The lugs 20 are provided with tapering surfaces 21 and key-engaging surfaces 22. The ring 19 is provided with stop members 23.

A sleeve 24 is disposed concentric with the tube 14, and is provided with a reduced portion 25 which is adapted to enter the female portion. The reduced portion 25 is provided with recesses 26 therein. Pins 27 are rigidly disposed in the sleeve 24, see Figure 2. A spring 28 is disposed concentric with the tube 14, one end thereof striking against the sleeve 24, and the other end receivable within a retainer ring 29. An annular flange 30 is disposed concentric with the tube 14 adjacent the retainer ring 29, and is held in place by a locking ring 31 which is receivable in the recess 16.

In Figure 6, I have shown a female member which is similar in construction to the female member shown in Figure 1, with the exception of a threaded portion 32 which is provided to permit the device to be applied to a metal pipe or tube.

From the foregoing description of the various parts of the device, the operation thereof may be readily understood. Let us assume that the male and female members are separated and provided with their suitable hose connections. To connect the male and female members together, they are placed in positions so that when moved toward each other, the keys 11 will pass between the lugs 20 of the male member. At this point, the sleeve 24 is moved away from the female member against the tension of the spring 28 to permit the male member to enter the female member a sufficient distance. At this point, the male and female members are turned in opposite directions, causing the keys 11 to ride upon the adjacent tapering surfaces 21 of the lugs 20 until the keys are in engagement with the surfaces 22 of the lugs 20. The sleeve 24 is then released, permitting the pins 27 to enter the slots 13, the stops 23 always remaining in the recesses 26. The male and female members are now positively locked together, as clearly shown in Figure 1.

It is obvious that the members may be connected or disconnected by moving the male member in either direction with respect to the female member. With this construction, there will be no possibility of the members being forced in the wrong direction, for disconnecting them and causing them to be damaged and become inseparable. Furthermore, when the keys 11 have reached their position upon the surfaces 22 of the lugs 20, the connection between the male and female members is positive, and there is no tendency for the members to become disconnected.

When the male and female members are in locked position, the conical surface 18 is receivable in the tapering recess 8, and the annular flange 17 is received within the gasket 6. The gasket 6 provides a liquid-tight connection, due to the recess 7 therein. As the air or liquid is forced through the opening 4 and through the tube 14, the air or liquid may tend to move past the gasket 6. In doing so, it enters the recess 7 and forces the walls of the gasket against the annular recess 5 and the flange 17. In this manner, a leak-proof joint is provided.

It will be observed that the keys 11 are partially embedded in the groove 10′ and conform to the walls thereof. In this manner, the pressure which is applied to the keys is against the walls of the groove 10′ and not against the pin 12. In this manner, the keys are stronger and are adapted to have more pressure applied thereto than if they were dependent upon the pins 12 alone.

The tube 14 is so constructed that when male and female members are locked together, the tube 14 may be rotated with respect to the female member, the ring 19, and the sleeve 24. The purpose of this is to enable the twist to be taken out of the hose without the necessity of uncoupling the device.

I claim:

1. A hose coupling comprising a female member having an inner wall, an outer wall, and relatively small openings, keys, pins integral with said keys, said pins disposed in the openings and rigidly secured in place, a male member, a ring carried by said male member, lugs integral with said ring, said lugs being adapted to engage with said keys when said male member is rotated in either direction with respect to said female member, and means for locking said ring, said male member, and said female member in place.

2. A hose coupling comprising a female member having an inner wall, an outer wall, and relatively small openings, keys, pins integral with said keys, said pins disposed in the openings and rigidly secured in place, a male member, a ring carried by said male member, lugs integral with said ring, said lugs being adapted to engage with said keys when said male member is rotated in either direction with respect to said female member, a sleeve carried by said male member, and means carried by said sleeve and cooperating with said ring and said sleeve for holding said ring and said female member against rotation with respect to said sleeve.

3. A hose connection comprising a female member having a key and provided with a recess, a male member adapted to enter the female member and rotatable therein, said male member having a ring rotatably disposed thereon and provided with a lug having a cam surface arranged to engage said key and to draw said male and female members into locking relation when rotated, and a spring-pressed sleeve slidable longitudinally on said male member and having a projection adapted to enter said recess in the locking position.

4. A hose connection comprising a female member having a key and provided with a recess, a male member adapted to enter the female member and rotatable therein, said male member having a ring rotatably disposed thereon and provided with a lug having a cam surface on each end thereof arranged to engage with said key and to draw said male and female members into locking position when rotated in either direction, and a spring-pressed sleeve slidable longitudinally on said male member and having a projection adapted to enter said recess in the locking position.

5. A hose coupling comprising a female member having an outer wall, an inner wall, grooves in said inner wall and relatively small openings in said grooves, keys receivable in said grooves, pins integral with said keys and receivable in said openings and rigidly secured in place, a male member, a ring carried by said male member, lugs integral with said ring, said lugs being adapted to engage with said keys when said male member is rotated in either direction with respect to said female member, a sleeve carried by said male member, and means carried by said sleeve and cooperating with said ring and said female member for holding said ring and said sleeve against rotation with respect to said female member.

6. A hose coupling comprising a female member having an inner wall, arcuate-shaped grooves in said inner wall, keys receivable for a portion of their width in said grooves and firmly held against displacement by the walls of said grooves, pins integral with said keys adapted to extend through openings in said grooves for rigidly holding said keys in said grooves, a male member, a ring carried by said male member, lugs integral with said ring having tapering surfaces and key-retaining surfaces, said lugs being adapted to engage with said keys for moving said keys along said tapering surfaces and into engagement with said key-retaining surfaces when said male member is rotated in either direction with respect to said female member, a sleeve carried by said male member, and means carried by said sleeve and cooperating with said ring and said female member for holding said ring and said sleeve against rotation with respect to said female member.

7. A hose coupling comprising a female member having an inner wall, an outer wall, and relatively small openings, keys, pins integral with said keys, said keys being curved to conform to the inner wall of said female member, said pins disposed in the openings and rigidly secured in place, a male member, a ring carried by said male member, lugs carried by said ring, said lugs being adapted to engage with said keys when said male member is rotated in either direction with respect to said female member, a sleeve carried by said male member, lugs integral with said sleeve receivable in recesses in said female member for holding said ring and said sleeve against rotation with respect to said female member.

8. A hose connection comprising a female member having a key, a male member adapted to enter the female member and rotatable therein, said male member having a ring rotatably disposed thereon and provided with a lug having a cam surface adapted to engage with said key to draw said male and female members into locking relation when said ring is rotated with respect to said female member, a spring-pressed sleeve slidably mounted on said male member and co-operating with said ring in rotative relation, and locking means, including a projection and a recess to maintain the sleeve against rotation with respect to the female member.

9. A hose connection comprising a female member having a key, a male member adapted to enter the female member and rotatable therein, said male member having a ring rotatably disposed thereon and provided with a lug having a surface adapted to engage with said key when rotated, to retain said male and female members in locked relation, a spring-pressed sleeve slidably mounted on said male member and co-operating with said ring in rotative relation, and locking means, including a projection and a recess to maintain the sleeve against rotation with respect to said female member and to prevent said lug from moving out of locking relation with said key.

10. A hose coupling comprising a female member having a key-retaining groove in its inner wall, a key disposed in said groove for a portion of its depth and rigidly secured to said female member, a male member comprising a connection to which a hose may be attached, and a ring rotatable on said male member, said ring having a lug adapted to engage the key in said female member to lock the male member in the female member, the male member being rotatable with respect to the female member when in locked position.

11. A hose coupling comprising a female member having an inner wall, keys in said inner wall, a male member, a ring provided with lugs on its outer surface carried by said male member, said lugs having tapering surfaces and key-retaining surfaces and being adapted to engage with said keys for moving said keys along said tapering surfaces and into engagement with said key-retaining surfaces when said ring is rotated with respect to said female member, a sleeve carried by said male member, and means carried by said sleeve and co-operating with said ring and said female member for holding said sleeve and said ring against rotation with respect to said female member.

HENRY H. LOGAN.